United States Patent [19]
Adams et al.

[11] Patent Number: 5,750,586
[45] Date of Patent: May 12, 1998

[54] PRODUCTION OF CFC-FREE POLYURETHANE RIGID FOAMS HAVING A REDUCED THERMAL CONDUCTIVITY AND THEIR USE

[75] Inventors: Stefan Adams, Ludwigshafen; Holger Seifert, Freital, both of Germany

[73] Assignee: BASF Aktiengesellschaft, Ludwigshafen, Germany

[21] Appl. No.: 850,354

[22] Filed: May 2, 1997

Related U.S. Application Data

[62] Division of Ser. No. 563,470, Nov. 28, 1995, Pat. No. 5,670,554.

[30] Foreign Application Priority Data

Jan. 10, 1995 [DE] Germany ............... 195 00 466.3

[51] Int. Cl.$^6$ ................................. C08G 18/10
[52] U.S. Cl. .................. 521/159; 521/131; 521/172
[58] Field of Search ................... 521/131, 159, 521/172

[56] References Cited

U.S. PATENT DOCUMENTS 5,096,933  3/1992  Volkert.
5,428,077  6/1995  Lamberts et al..

FOREIGN PATENT DOCUMENTS 0 547 515 A2  6/1993  European Pat. Off..

WO 93/08224  4/1993  WIPO.

*Primary Examiner*—Morton Foelak
*Attorney, Agent, or Firm*—Fernando A. Borrego

[57] ABSTRACT

A process for producing CFC-free polyurethane rigid foams having reduced thermal conductivity comprises reacting a) isocyanate semiprepolymers modified with urethane groups and containing from 31 to 20% by weight of NCO, based on aromatic polyisocyanates and at least one aromatic and/or preferably aliphatic polyester-polyol having a hydroxyl number of from 22 to 400, b) at least one relatively high molecular weight compound containing at least two reactive hydrogen atoms, which advantageously have arylene units bonded to them, and, if desired, c) low molecular weight chain extenders and/or crosslinkers in the presence of d) blowing agents, preferably cyclopentane and/or cyclohexane in combination with water, e) catalysts and, if desired, f) additives.

The CFC-free polyurethane rigid foams are preferably used as insulation material in refrigeration appliances and as insulation in composite and heating elements, for example for insulating remote heating pipes.

10 Claims, No Drawings

PRODUCTION OF CFC-FREE POLYURETHANE RIGID FOAMS HAVING A REDUCED THERMAL CONDUCTIVITY AND THEIR USE

This is a divisional of application Ser. No. 08/563,470 filed Nov. 28, 1995, now U.S. Pat. No. 5,670,554.

The invention relates to a process for producing CFC-free polyurethane, hereinafter abbreviated to PU, rigid foams having a reduced thermal conductivity by reacting (a) polyester isocyanate semiprepolymers modified with urethane groups and containing from 31 to 20% by weight of isocyanate with (b) relatively high molecular weight compounds containing at least two reactive hydrogen atoms and advantageously having arylene units bonded to them and, if desired, (c) low molecular weight chain extenders and/or crosslinkers in the presence of (d) blowing agents, preferably blowing agent mixtures of cyclopentane and/or cyclohexane and water, with completely halogenated chlorofluorocarbons being excluded as blowing agent, (e) catalysts and, if desired, (f) additives, and the use of these PU rigid foam formulations for filling hollow spaces in refrigeration appliances or heating elements with foam and the use of the PU rigid foams as insulation material for composite elements, eg. as insulation shells for (remote) heating pipes.

The production of composite or sandwich elements which are built up of a PU rigid foam and at least one coating layer of a rigid or elastic material such as, for example, paper, plastic films, metal sheets, glass nonwovens, chipboards, etc., is known. Also known is the filling of hollow spaces in household appliances such as refrigeration appliances, for example refrigerators or freezer chests, with foam or foam-cladding hot water tanks, by introducing a fluid reaction mixture to form the PU rigid foams as thermal insulation. To avoid flaws in the foam, the foamable PU reaction mixture must here be introduced within a short time into the hollow space to be insulated. For insulating such articles, use is usually made of low-pressure or preferably high-pressure machines.

A summary overview of the production of PU rigid foams and their use as covering or preferably core layer in composite elements and their use as insulation layer in refrigeration or heating engineering has been, for example, published in Polyurethane, Kunststoff-Handbuch, volume 7, 1st edition 1966, by Dr. R. Vieweg and Dr. A. Höchtlen (editors), and 2nd edition 1983, by Dr. Günter Oertel, Carl Hanser Verlag, Munich, Vienna.

Heat- and cold-insulating PU rigid foams suitable for this purpose can, as is known, be produced by reacting organic polyisocyanates with one or more relatively high molecular weight compounds containing at least two reactive hydrogen atoms, preferably polyester- and/or polyether-polyols, usually together with low molecular weight chain extenders and/or crosslinkers, in the presence of blowing agents, catalysts or, if desired, auxiliaries and/or additives. Suitable selection of the formative components can here give PU rigid foams having a low thermal conductivity and good mechanical properties.

As blowing agents for producing the heat- and cold-insulating PU rigid foams, use is made worldwide on a large scale of chlorofluoroalkanes (CFCs), preferably trichlorofluoromethane. However, these blowing gases have the disadvantage of polluting the environment, since they are suspected of contributing to the degradation of the ozone layer in the stratosphere.

There have therefore been many attempts to replace the CFCs by blowing agents which cause little or preferably no environmental damage.

According to EP-A-351 614 (U.S. Pat. No. 4,972,002), fluorinated hydrocarbons, perfluorinated hydrocarbons, sulfur hexafluoride or mixtures of at least two of these compounds can be used as blowing agents. Since these fluorinated or perfluorinated blowing agents are sparingly soluble or insoluble in the formative components for producing the polyisocyanate polyaddition products, they are emulsified in at least one organic and/or modified organic polyisocyanate, at least one relatively high molecular weight compound containing at least two reactive hydrogen atoms or a mixture of at least one relatively high molecular weight compound containing at least two reactive hydrogen atoms and a low molecular weight chain extender and/or crosslinker. This method can be used to produce cellular plastics having a uniform and fine cell structure. However, this process has the disadvantages of the limited choice of suitable fluorinated or perfluorinated compounds having a boiling point in the required boiling point range and the high price for these blowing agents. To obtain cellular plastics having the technically desired cell structure, one has to rely on a very limited selection of mixtures of perfluoropentane and perfluorohexane.

To prepare cellular plastics by the polyisocyanate polyaddition process, blowing agents (d) which have, according to DE-A-41 43 148, proven very suitable, if desired in combination with water, are mixtures containing at least one low-boiling, fluorinated or perfluorinated, organic compound sparingly soluble or insoluble in the formative components (a), (b) or (c) and at least one isoalkane having from 6 to 12 carbon atoms.

PU rigid foams having a low thermal conductivity are also described in EP-A-0 421 269 (U.S. Pat. No. 5,096,933). Blowing agents used, preferably in combination with water, are cyclopentane or mixtures, advantageously having a boiling point below 50° C., which comprise:

cyclopentane and/or cyclohexane and at least one inert, low-boiling compound homogeneously miscible with cyclopentane and/or cyclohexane, preferably from the group consisting of the alkanes, cycloalkanes having at most 4 carbon atoms, dialkyl ethers, cycloalkylene ethers and fluoroalkanes.

Appropriate selection of the blowing agents, which remain as cell gas in the PU rigid foam for a considerable period of time since their diffusion rate is very low, in particular, if the PU rigid foams are provided on all sides with plastic or metal covering layers, was able to reduce the thermal conductivity of the PU rigid foams considerably.

Since heat transport from a hot to a cold point in a foam can occur, for example, via the foam matrix, via the cell gas and by radiation, there is the further need to minimize the thermal conductivity of PU rigid foams by means of appropriate measures and thereby to reduce the energy consumption, eg. in refrigeration appliances, or the heat loss, eg. of (remote) heating systems and hot water tanks by means of insulation elements.

Also known is the use of polyisocyanate mixtures modified with polyester-polyols for producing rigid foams containing urethane groups or urethane and isocyanurate groups.

According to, for example, EP-A-0 239 704, PU foams are produced using polyisocyanate mixtures containing urethane groups and from 15 to 32% by weight of NCO, these polyisocyanate mixtures being prepared by reacting a polyester-polyol with a mixture of from 45 to 95% by weight of diphenylmethane diisocyanates (MDI) and from 55 to 5% by weight of a polyphenyl-polymethylene polyisocyanate (PMDI) having a functionality of 3 or more. EP-A-0 358 328 likewise describes isocyanate mixtures containing from 10 to 90% by weight of an NCO prepolymer having a functionality of from 2.0 to 2.3 and based on a polyester-polyol and from 90 to 10% by weight of an NCO prepolymer having a functionality of from 2.0 to 2.3 and based on a polyoxyalkylene-polyol containing from 3 to 50% by weight of ethylene oxide. NCO prepolymers are also prepared, according to DD 237 758, by reacting 4,4'-MDI with various polyoxyalkylene-polyols and, if desired, polyester-polyols.

Polyurethane (PU)-polyisocyanurate (PIR) rigid foams having a low thermal conductivity can, according to U.S. Pat. No. 4,888,365, be produced from prepolymers based on polyester-polyol and containing isocyanate groups, with the polyester-polyols being obtained by transesterification of polyethylene terephthalate waste or by esterification of phthalic anhydride with aliphatic polyhydric alcohols. However, the blowing agents used for producing these PU-PIR foams are, if desired in combination with water, chlorofluorocarbons, preferably trichlorofluoromethane, which are known to have an extremely low thermal conductivity. The patent says nothing about the use of blowing agents which are not perhalogenated for the PU-PIR matrix or for PU rigid foams produced using polyester isocyanate semiprepolymers.

It is an object of the present invention to reduce further the thermal conductivity of PU rigid foams. The use of toxic and/or environmentally damaging blowing agents should be completely omitted if possible. The polyol and polyisocyanate components (A) and (B) respectively should be stable on storage and the reaction mixture for producing the PU rigid foams should be very fluid and cure without shrinkage.

We have found that this object is achieved by use of specific polyester isocyanate semiprepolymers modified with urethane groups as polyisocyanate component (B) and, advantageously, (cyclo)alkanes as blowing agent for producing the PU rigid foams.

The invention accordingly provides a process for producing CFC-free PU rigid foams having further reduced thermal conductivity by reacting a) at least one organic polyisocyanate mixture modified with urethane groups with b) at least one relatively high molecular weight compound containing at least two reactive hydrogen atoms and, if desired, c) low molecular weight chain extenders and/or crosslinkers in the presence of d) blowing agents, e) catalysts and, if desired, f) additives, wherein the polyisocyanate mixtures modified with urethane groups (a) are polyester isocyanate semiprepolymers containing from 31 to 20% by weight of NCO and obtainable by reacting an excess amount of at least one aromatic polyisocyanate with at least one polyester-polyol having a hydroxyl number of from 22 to 400 and based on aromatic and/or aliphatic dicarboxylic acids and/or dicarboxylic acid derivatives.

In a preferred embodiment, the polyester isocyanate semiprepolymers are prepared using polyester-polyols prepared by polycondensation of alkanedicarboxylic acids having from 4 to 6 carbon atoms with mixtures of alkanediols having from 2 to 6 carbon atoms and dialkylene glycols having from 4 to 8 carbon atoms, and advantageously, as relatively high molecular weight compounds (b), polyether polyols prepared by anionic polyaddition of ethylene oxide and/or 1,2-propylene oxide to initiator molecules containing aromatic radicals.

The process of the invention enables the thermal conductivity of the PU rigid foams produced under otherwise identical conditions to be reduced by at least 0.5 mW/mK, preferably by from 0.6 to 2.7 mW/mK or more.

On the production of the PU rigid foams and the examples of starting components suitable for their production, the following may be said:

a) According to the invention, the CFC-free PU rigid foams are produced using polyester isocyanate semiprepolymers containing from 31 to 20% by weight, preferably from 31 to 25% by weight, of NCO, based on the total weight, and obtainable in a manner known per se by reacting an excess amount of at least one aromatic polyisocyanate with at least one polyester-polyol having a hydroxyl number of from 22 to 400, preferably from 22 to 180 when using aliphatic polyester-polyols and from 220 to 340 when using aromatic polyester-polyols.

Examples which may be mentioned of suitable aromatic polyisocyanates for preparing the polyester isocyanate semiprepolymers which can be used according to the invention are 4,4'-, 2,4'- and 2,2'-diphenylmethane diisocyanate, polyphenyl-polymethylene polyisocyanates, 2,4- and 2,6-tolylene diisocyanate and mixtures of at least two of the specified aromatic polyisocyanates. Aromatic polyisocyanates which have been found to be very useful and are therefore preferably used are mixtures of diphenylmethane diisocyanate isomers and polyphenyl-polymethylene polyisocyanates, with preference being given to those having a diphenylmethane diisocyanate isomer content of, for example, from 30 to 80% by weight, preferably from 35 to less than 45% by weight and in particular less than 40% by weight.

Suitable polyester-polyols having hydroxyl numbers of from 22 to 400 for preparing the polyester isocyanate semiprepolymers are obtainable by polycondensation of alkanedicarboxylic acids, preferably those having from 4 to 6 carbon atoms, aromatic dicarboxylic acids, preferably phthalic acid, or corresponding dicarboxylic acid derivatives, eg. dicarboxylic monoalkyl and/or dialkyl esters having from 1 to 4 carbon atoms in the alkyl radical or dicarboxylic anhydrides, with alkanediols having from 2 to 6 carbon atoms, dialkylene glycols having from 4 to 8 carbon atoms or preferably mixtures of such alkanediols and dialkylene glycols. Examples which may be mentioned of polyester-polyol formative components which are preferably used are: as aliphatic dicarboxylic acids, mixtures of succinic, glutaric and adipic acid, eg. these acids in weight ratios of 20 to 35:35 to 50:20 to 32 parts by weight and in particular adipic acid; as aromatic dicarboxylic acid, phthalic acid; as alkanediol, ethanediol; and as dialkylene glycol, diethylene glycol. Suitable polyester-polyol formative components are also organic dicarboxylic acids such as succinic, glutaric, maleic and fumaric acid and also isophthalic acid and terephthalic acid, their dicarboxylic monoalkyl and/or dialkyl esters and dicarboxylic anhydrides, alkanediols such as 1,2-propanediol, 1,4-butanediol, 1,5-pentanediol and 1,6-hexanediol, and dialkylene glycols such as dipropylene glycol and dibutylene glycol, and also lactones such as ε-caprolactone or hydroxycarboxylic acids such as ω-hydroxycaproic acid and hydroxybenzoic acid. The polyester-polyol formative components emphasized as preferred and those mentioned as additional examples can be used individually or in the form of mixtures of at least two dicarboxylic acids and/or derivatives and at least two alkanediols and/or dialkylene glycols. Polyester-polyols which are preferably used are aliphatic polyester-polyols, for example those from aliphatic dicarboxylic acids and/or derivatives, alkanediols and/or dialkylene glycols. Use is advantageously made of polyester-polyols having at least 10% by weight, preferably at least 25% by weight, of radicals of aromatic and/or, in particular, aliphatic dicarboxylic acids bonded to them. Preference is given to using poly(ethanediol-diethylene glycol phthalates) having hydroxyl numbers of from 180 to 400, preferably from 220 to 340, and particular preference is given to poly(ethanediol-diethylene glycol adipates) having hydroxyl numbers of from 22 to 180, preferably from 40 to 100.

The polyester isocyanate semiprepolymers containing from 31 to 20% by weight of NCO which can be used according to the invention can be prepared by known methods. For this purpose, the aromatic polyisocyanates are customarily heated in a suitable reaction vessel to from 40° to 110° C., preferably from 60° to 80° C. Over a period of, for example, from 5 to 120 minutes, preferably from 15 to 60 minutes, the polyester-polyols are added while stirring in such an amount that the ratio of NCO groups: OH groups is from 1:0.01 to 1:0.2, preferably from 1:0.02 to 1:0.1 and in particular from 1:0.02 to 1:0.05. To complete the reaction, the reaction mixture is advantageously stirred in the above temperature range for a further 0.5 to 2 hours and subsequently allowed to cool to room temperature. According to another process variant, the aromatic polyisocyanates can be reacted with an amount of polyester-polyol having an NCO group:OH group ratio of from about 1:0.05 to 1:0.3, preferably from 1:0.1 to 1:0.2, and the polyisocyanate mixture formed which is modified with urethane groups can then be mixed with the same or another aromatic polyisocyanate in such amounts that from 30 to 70% by weight, preferably from 40 to 60% by weight, of unmodified aromatic polyisocyanates are present in the polyester isocyanate semiprepolymer.

b) Suitable relatively high molecular weight compounds containing at least two reactive hydrogen atoms (b) are preferably polyhydroxyl compounds having a functionality of from 2 to 8, preferably from 3 to 8, and a hydroxyl number of from 100 to 850, preferably from 120 to 770.

Examples which may be mentioned are hydroxyl-containing polyesteramides, hydroxyl-containing polyacetals, hydroxyl-containing aliphatic polycarbonates and, preferably, polyester-polyols and polyether-polyols. Also useful are mixtures of at least two of the polyhydroxyl compounds specified, and also with polyhydroxyl compounds having hydroxyl numbers of less than 100, as long as the mixtures have an average hydroxyl number in the abovementioned range.

Suitable polyester-polyols can be prepared, for example, from organic dicarboxylic acids having from 2 to 12 carbon atoms, preferably aromatic dicarboxylic acids having from 8 to 12 carbon atoms, and polyhydric alcohols, preferably diols, having from 2 to 12 carbon atoms, preferably from 2 to 6 carbon atoms. Suitable dicarboxylic acids are, for example: succinic acid, glutaric acid, adipic acid, suberic acid, azelaic acid, sebacic acid, decanedicarboxylic acid, maleic acid, fumaric acid and, preferably, phthalic acid, isophthalic acid, terephthalic acid and the isomeric naphthalenedicarboxylic acids. The dicarboxylic acids can here be used either individually or in a mixture. In place of the free dicarboxylic acids, it is also possible to use the corresponding dicarboxylic acid derivatives such as dicarboxylic esters of alcohols having from 1 to 4 carbon atoms or dicarboxylic anhydrides. Preference is given to using dicarboxylic acid mixtures of succinic, glutaric and adipic acid and, in particular, mixtures of phthalic acid and/or phthalic anhydride and adipic acid, mixtures of phthalic acid (anhydride), isophthalic acid and adipic acid or dicarboxylic acid mixtures of succinic, glutaric and adipic acid and mixtures of terephthalic acid and adipic acid or dicarboxylic acid mixtures of succinic, glutaric and adipic acid. Examples of dihydric and polyhydric alcohols, in particular diols, are: ethanediol, diethylene glycol, 1,2- or 1,3-propanediol, dipropylene glycol, 1,4-butanediol, 1,5-pentanediol, 1,6-hexanediol, 1,10-decanediol, glycerol and trimethylolpropane. Preference is given to using ethanediol, diethylene glycol, 1,4-butanediol, 1,5-pentanediol, 1,6-hexanediol or mixtures of at least two of the diols specified, in particular mixtures of 1,4-butanediol, 1,5-pentanediol and 1,6-hexanediol. It is also possible to use polyester-polyols derived from lactones, eg. ε-caprolactone, or hydroxycarboxylic acids, eg. ω-hydroxycaproic acid and hydroxybenzoic acids.

The polyester-polyols can be prepared by polycondensing the organic, eg. aliphatic and preferably aromatic and mixtures of aromatic and aliphatic, polycarboxylic acids and/or derivatives with polyhydric alcohols in the absence of catalysts or preferably in the presence of esterification catalysts, advantageously in an atmosphere of inert gases, for example nitrogen, carbon monoxide, helium, argon, etc., in the melt at from 150° to 250° C., preferably from 180° to 220° C., at atmospheric or subatmospheric pressure until the desired acid number is reached, this being advantageously less than 10, preferably less than 2. According to a preferred embodiment, the esterification mixture is polycondensed at the abovementioned temperatures under atmospheric pressure and subsequently under a pressure of less than 500 mbar, preferably from 50 to 150 mbar, until an acid number of from 80 to 30, preferably from 40 to 30, is reached. Suitable esterification catalysts are, for example, iron, cadmium, cobalt, lead, zinc, antimony, magnesium, titanium and tin catalysts in the form of metals, metal oxides or metal salts. However, the polycondensation can also be carried out in the liquid phase in the presence of diluents and/or entrainers such as benzene, toluene, xylene or chlorobenzene for azeotropically distilling off the water of condensation.

The polyester-polyols are prepared by polycondensing the organic polycarboxylic acids and/or derivatives with polyhydric alcohols in a molar ratio of advantageously 1:1 to 1.8, preferably 1:1.05 to 1.2.

The polyester-polyols obtained preferably have a functionality of from 2 to 3 and a hydroxyl number of from 150 to 600, in particular from 200 to 400.

In particular, however, polyhydroxyl compounds used are polyether polyols which are prepared by known methods, for example by anionic polymerization using alkali metal hydroxides such as sodium or potassium hydroxide or alkali metal alkoxides such as sodium methoxide, sodium or potassium ethoxide or potassium isopropoxide as catalysts with addition of at least one initiator molecule containing from 2 to 8, preferably from 3 to 8, reactive hydrogens bonded to it, or by catalytic polymerization using Lewis acids such as antimony pentachloride, boron trifluoride etherate, etc., or bleaching earth as catalysts from one or more alkylene oxides having from 2 to 4 carbon atoms in the alkylene radical.

Suitable alkylene oxides are, for example, tetrahydrofuran, 1,3-propylene oxide, 1,2- or 2,3-butylene oxide, styrene oxide and preferably ethylene oxide and 1,2-propylene oxide. The alkylene oxides can be used individually, successively or as mixtures. Examples of suitable initiator molecules are: water, organic dicarboxylic acids such as succinic acid, adipic acid, phthalic acid and terephthalic acid, aliphatic and aromatic diamines, which may be unsubstituted, N-monoalkyl substituted, N,N- or N,N'-dialkyl substituted, having from 1 to 4 carbon atoms in the alkyl radical, for example unsubstituted, monoalkyl substituted or dialkyl substituted ethylenediamine, diethylenetriamine, triethylenetetramine, 1,3-propylenediamine, 1,3- or 1,4-butylenediamine, 1,2-, 1,3-, 1,4-, 1,5- and 1,6-hexamethylenediamine, aniline, phenylenediamine, 2,3-, 2,4-, 3,4- and 2,6-tolylenediamine and 4,4'-, 2,4'- and 2,2'-diaminodiphenylmethane.

Other suitable initiator molecules are: alkanolamines such as ethanolamine, N-methylethanolamine and N-ethylethanolamine, dialkanolamines such as diethanolamine, N-methyldiethanolamine and N-ethyldiethanolamine and trialkanolamines such as triethanolamine and ammonia and polyhydric, in particular dihydric and/or trihydric, alcohols such as ethanediol, 1,2- and 1,3-propanediol, diethylene glycol, dipropylene glycol, 1,4-butanediol, 1,6-hexanediol, glycerol, trimethylolpropane, pentaerythritol, sorbitol and sucrose, polyhydric phenols such as 4,4'-dihydroxydiphenylmethane and 2,2-bis(4-hydroxyphenyl)propane, resols such as oligomeric condensation products of phenol and formaldehyde and Mannich condensates of phenols, formaldehyde and dialkanolamines and also melamine.

Further compounds which can be used as relatively high molecular weight compounds (b) are polyether-polyols having a functionality of from 2 to 8 and a hydroxyl number of from 100 to 850, which are prepared by anionic polymerization of at least one alkylene oxide, preferably ethylene oxide or 1,2-propylene oxide or 1,2-propylene oxide and ethylene oxide, to at least one aromatic compound containing at least one hydroxyl, amino and/or carboxyl group and at least two reactive hydrogen atoms as initiator molecules. Examples of such initiator molecules which may be mentioned are aromatic polycarboxylic acids such as hemimellitic acid, trimellitic acid, trimesitic acid and preferably phthalic acid, isophthalic acid and terephthalic acid or mixtures of at least two of the polycarboxylic acids mentioned, hydroxycarboxylic acids such as salicylic acid, p- and m-hydyroxybenzoic acid and gallic acid, aminocarboxylic acids such as anthranilic acid, m- and p-aminobenzoic acid, polyphenols such as resorcinol and preferably dihydroxydiphenylmethanes and 2,2-bis (hydroxyphenyl)propanes, Mannich condensates of phenols, formaldehyde and dialkanolamines, preferably diethanolamine, and preferably aromatic polyamines such as 1,2-, 1,3- and 1,4-phenylenediamine and in particular 2,3-, 2,4-, 3,4- and 2,6-tolylenediamine, 4,4'-, 2,4'- and 2,2'-diaminodiphenylmethane, polyphenyl-polymethylene-polyamines, mixtures of diaminodiphenylmethanes and polyphenyl-polymethylene-polyamines such as are formed, for example, by condensation of aniline with formaldehyde, and mixtures of at least two of the specified polyamines.

The preparation of polyether-polyols using such aromatic initiator molecules which are at least difunctional, is known and is described, for example, in the Patents DD-A-290 201, DD-A-290 202, DE-A-34 12 082, DE-A-4 232 970 and GB-A-2 187 449.

The polyether-polyols have a functionality of preferably from 3 to 8 and in particular from 3 to 6 and hydroxyl numbers of preferably from 120 to 770 and in particular from 240 to 570.

Other suitable polyether-polyols are melamine-polyether-polyol dispersions as described in EP-A-23 987 (U.S. Pat. No. 4,293,657), polymer-polyether-polyol dispersions prepared from polyepoxides and epoxy resin hardeners in the presence of polyether-polyols as described in DE 29 43 689 (U.S. Pat. No. 4,305,861), dispersions of aromatic polyesters in polyhydroxyl compounds as described in EP-A-62 204 (U.S. Pat. No. 4,435,537) or DE-A 33 00 474, dispersions of organic and/or inorganic fillers in polyhydroxyl compounds as described in EP-A-11 751 (U.S. Pat. No. 4,243,755), polyurea-polyether-polyol dispersions as described in DE-A-31 25 402, tris(hydroxyalkyl) isocyanurate-polyether-polyol dispersions as described in EP-A-136 571 (U.S. Pat. No. 4,514,526) and crystallite suspensions as described in DE-A-33 42 176 and DE-A-33 42 177 (U.S. Pat. No. 4,560,708). The details in the Patent Publications mentioned are to be regarded as part of the Patent description.

The polyether-polyols can, like the polyester-polyols, be used individually or in the form of mixtures. Furthermore, they can be mixed with the graft polyether-polyols or polyester-polyols and the hydroxyl-containing polyesteramides, polyacetals, polycarbonates and/or phenolic polyols.

Suitable hydroxyl-containing polyacetals are, for example, the compounds which can be prepared from glycols such as diethylene glycol, triethylene glycol, 4,4'-dihydroxyethoxydiphenyldimethylmethane, hexanediol and formaldehyde. Suitable polyacetals can also be prepared by polymerizing cyclic acetals.

Suitable hydroxyl-containing polycarbonates are those of a type known per se which can be prepared, for example, by reacting diols such as 1,3-propanediol, 1,4-butanediol and/or 1,6-hexanediol, diethylene glycol, triethylene glycol or tetraethylene glycol with diaryl carbonates, eg. diphenyl carbonate, or phosgene.

The polyesteramides include, for example, the predominantly linear condensates obtained from polybasic, saturated and/or unsaturated carboxylic acids or their anhydrides and polyhydric saturated and/or unsaturated amino alcohols or mixtures of polyhydric alcohols and amino alcohols and/or polyamines.

Other suitable relatively high molecular weight compounds containing at least two reactive hydrogen atoms (b) are phenolic and halogenated phenolic polyols, for example resol-polyols containing benzyl ether groups. Resol-polyols of this type can be prepared, for example, from phenol, formaldehyde, advantageously paraformaldehyde, and polyhydric aliphatic alcohols and are described, for example, in EP-A-0 116 308 and EP-A-0 116 310.

Other relatively high molecular weight compounds (b) which can advantageously be used are mixtures of polyether-polyols containing at least one polyether-polyol based on an aromatic, polyfunctional initiator molecule and at least one polyether-polyol based on a nonaromatic initiator molecule, preferably a trihydric to octahydric alcohol.

c) The PU rigid foams can be produced with or without the use of chain extenders and/or crosslinkers. However, for the purpose of modifying the mechanical properties, it has been found to be advantageous to add difunctional chain extenders, trifunctional crosslinkers or those of higher functionality or, if desired, mixtures thereof. Chain extenders and/or crosslinkers used are preferably alkanolamines and, in particular, diols and triols having molecular weights of less than 400, preferably from 60 to 300. Suitable compounds are, for example, alkanolamines such as ethanolamine and/or isopropanolamine, dialkanolamines such as diethanolamine, N-methyldiethanolamine, N-ethyldiethanolamine, diisopropanolamine, trialkanolamines such as triethanolamine, triisopropanolamine and the addition products of ethylene oxide or 1,2-propylene oxide and alkylenediamines having from 2 to 6 carbon atoms in the alkylene radical such as N,N,N',N'-tetra(2-hydroxyethyl) ethylenediamine and N,N,N',N'-tetra(2-hydroxypropyl) ethylenediamine, aliphatic, cycloaliphatic and/or araliphatic diols having from 2 to 14, preferably from 4 to 10, carbon atoms such as ethylene glycol, 1,3-propanediol, 1,10-decanediol o-, m-, p-dihydroxycyclohexane, diethylene glycol, dipropylene glycol and preferably 1,4-butanediol, 1,6-hexanediol and bis(2-hydroxyethyl)hydroquinone, triols such as 1,2,4-, 1,3,5-trihydroxycyclohexane, glycerol and trimethylolpropane and low molecular weight hydroxyl-containing polyalkylene oxides based on ethylene and/or 1,2-propylene oxide and aromatic diamines such as tolylenediamines and/or diaminodiphenylmethanes and also the alkanolamines, diols and/or triols mentioned above as initiator molecules.

If the PU rigid foams are produced using chain extenders, crosslinkers or mixtures thereof, these are advantageously used in an amount of from 0 to 20% by weight, preferably from 2 to 5% by weight, based on the weight of the polyhydroxyl compound.

d) The blowing agent used for producing the PU rigid foams is preferably cyclopentane (d1). However, very good results are also obtained using mixtures (d2) comprising (d2i) cyclopentane, cyclohexane or a mixture of the specified cycloalkanes and (d2ii) at least one low-boiling compound which is homogeneously miscible with cyclopentane and/or cyclohexane, preferably a compound having a boiling point below 40° C.

The compounds of the specified type which are suitable as blowing agents can be selected from the group consisting of alkanes, cycloalkanes having at most 4 carbon atoms, dialkyl ethers, cycloalkylene ethers, fluoroalkanes and hydrogen-containing halogenated hydrocarbons (HCFCs). It is also possible to use mixtures of at least two compounds of the compound groups mentioned. Specific examples are: alkanes such as propane, n-butane, isobutane, n- and iso-pentane and also industrial pentane mixtures, cycloalkanes such as cyclobutane, dialkyl ethers such as dimethyl ether, methyl ethyl ether, methyl butyl ether or diethyl ether, cycloalkylene ethers, such as furan, and fluoroalkanes which are degraded in the troposphere and therefore do not damage the ozone layer, for example trifluoromethane, difluoromethane, difluoroethane, tetrafluoroethane and heptafluoropropane, and also HCFCs such as difluorochloromethane, 1,1-difluoro-1-chloroethane and preferably dichlorofluoroethane.

The preferred blowing agents can be used alone or preferably in combination with water, with the following combinations having been found to be very useful, so that they are advantageously used: water and cyclopentane, water and cyclopentane or cyclohexane or a mixture of these cycloalkanes and at least one compound from the group consisting of n-butane, isobutane, n- and iso-pentane, industrial pentane mixtures, cyclobutane, methyl butyl ether, diethyl ether, furan, trifluoromethane, difluoromethane, difluoroethane, tetrafluoroethane, heptafluoropropane and dichlorofluoroethane. The amount of low-boiling compounds homogeneously miscible with cyclopentane and/or cyclohexane which is used in combination with cyclohexane and, in particular, with cyclopentane is such that the mixture obtained advantageously has a boiling point below 50° C., in particular from 30° to 0° C. The amount required for this purpose depends on the shape of the boiling point curves of the mixture and can be experimentally determined by known methods. PU rigid foams having a low conductivity are obtained, in particular, if the blowing agent (d) used per 100 parts by weight of the formative component (b) is:

d1) from 3 to 22 parts by weight, preferably from 5 to 18 parts by weight and in particular from 8 to 14 parts by weight, of cyclopentane and from 0 to 7 parts by weight, preferably from 1.0 to 5.0 parts by weight and in particular from 2.2 to 4.5 parts by weight, of water or d2i) from 2 to 22 parts by weight, preferably from 5 to 19 parts by weight and in particular from 9 to 19 parts by weight, of cyclopentane and/or cyclohexane, d2ii) from 0.1 to 18 parts by weight, preferably from 0.5 to 10 parts by weight and in particular from 1.0 to 6.0 parts by weight, of at least one compound homogeneously miscible with cyclopentane and/or cyclohexane and having a boiling point below 40° C., selected from the group consisting of alkanes, cycloalkanes having at most 4 carbon atoms, dialkyl ethers, cycloalkylene ethers and fluoroalkanes and from 0 to 7 parts by weight, preferably from 1.0 to 5.0 parts by weight and in particular from 2.2 to 4.5 parts by weight, of water.

To produce the PU rigid foams, the cyclopentane (d1) or the blowing agent mixture (d2) is, preferably in combination with water, incorporated by methods known per se into at least one formative component (a), (b) or (c) for producing the PU rigid foam, at atmospheric or superatmospheric pressure, or it is fed directly into the reaction mixture, advantageously by means of a suitable mixing apparatus.

Blowing agents of the specified type are described, for example, in EP-A-0 421 269 (U.S. Pat. No. 5,096,933), the full scope of which is to be regarded as part of the Patent description.

Suitable blowing agents also include, for example, storage-stable, blowing agent-containing emulsions which contain at least one low-boiling, partially fluorinated or perfluorinated hydrocarbon sparingly soluble or insoluble in the formative components (a) to (c) and having from 3 to 8 carbon atoms, sulfur hexafluoride or mixtures thereof and at least one formative component (a), (b) or (c) as described in EP-A-0 351 614 or emulsions of mixtures of the abovementioned low-boiling partially fluorinated or perfluorinated hydrocarbons sparingly soluble or insoluble in the formative components (a) to (c) and having from 3 to 8 carbon atoms and at least one isoalkane having from 6 to 12 carbon atoms or cycloalkane having from 4 to 6 carbon atoms and at least one formative component (a), (b) or (c), for example as described in DE-A-41 43 148.

e) Catalysts (e) used are, in particular, compounds which strongly accelerate the reaction of the hydroxyl-containing compounds of the components (b) and, if applicable, (c) with the polyester isocyanate semiprepolymers of the invention. Suitable catalysts are organic metal compounds, preferably organic tin compounds such as tin(II) salts of organic carboxylic acids, eg. tin(II) diacetate, tin(II) dioctanoate, tin(II) diethylhexanoate and tin(II) dilaurate, and the dialkyltin(IV) salts of organic carboxylic acids, eg. dibutyltin diacetate, dibutyltin dilaurate, dibutyltin maleate and dioctyltin diacetate. The organic metal compounds are used alone or preferably in combination with strongly basic amines. Examples which may be mentioned are amidines such as 1,8-diazabicyclo[5.4.0]undec-7-ene, 2,3-dimethyl-3,4,5,6-tetrahydropyrimidine, tertiary amines such as triethylamine, tributylamine, dimethylbenzylamine, N-methylmorpholine, N-ethylmorpholine, N-cyclohexylmorpholine, N,N,N',N'-tetramethylethylenediamine, N,N,N',N'-tetramethylbutanediamine or N,N,N',N'- tetramethylhexanediamine, pentamethyldiethylenetriamine, bis(dimethylaminoethyl) ether, bis(dimethylaminopropyl) urea, dimethylpiperazine, 1,2-dimethylimidazole, 1-azabicyclo[3.3.0]octane and preferably 1,4-diazabicyclo[2.2.2]octane, and alkanolamine compounds such as triethanolamine, triisopropanolamine, N-methyldiethanolamine and N-ethyldiethanolamine and dimethylethanolamine.

Other suitable catalysts are: tris(dialkylaminoalkyl)-s-hexahydrotriazines, in particular 1,3,5-tris(N,N-dimethylaminopropyl)-s-hexahydrotriazine, tetraalkylammonium hydroxides, such as tetramethylammonium hydroxide, alkali metal hydroxides, such as sodium hydroxide, and alkali metal alkoxides such as sodium methoxide and potassium isopropoxide, and also alkali metal salts of long-chain fatty acids having from 10 to 20 carbon atoms, with or without lateral OH groups. Preference is given to using from 0.001 to 5% by weight, in particular from 0.05 to 2.5% by weight, of catalyst or catalyst combination, based on the weight of the component (b).

f) If desired, additives (f) can also be incorporated into the reaction mixture for producing the PU rigid foams. Examples which may be mentioned are surface-active substances, foam stabilizers, cell regulators, fillers, dyes, pigments, flameproofing agents, antistatic agents, hydrolysis inhibitors, fungistatic and bacteriostatic substances.

Suitable surface-active substances are, for example, compounds which aid the homogenization of the starting materials and may also be suitable for regulating the cell structure. Examples which may be mentioned are emulsifiers such as the sodium salts of castor oil sulfates or of fatty acids and also salts of fatty acids with amines, eg. diethylamine oleate, diethanolamine stearate, diethanolamine ricinoleate, salts of sulfonic acids, eg. alkali metal or ammonium salts of dodecylbenzenedisulfonic or dinaphthylmethanedisulfonic acid and ricinoleic acid; foam stabilizers such as siloxaneoxalkylene copolymers and other organopolysiloxanes, ethoxylated alkylphenols, ethoxylated fatty alcohols, paraffin oils, castor oil or ricinoleic esters, Turkey Red oil and peanut oil and cell regulators such as paraffins, fatty alcohols and dimethyl polysiloxanes. To improve the emulsifying action, the cell structure and/or the stabilization of the rigid foam, oligomeric polyacrylates having polyoxyalkylene and fluoroalkane radicals as side groups are also suitable. The surface-active substances are usually used in amounts of from 0.01 to 5 parts by weight, based on 100 parts by weight of the component (b).

For the purposes of the present invention, fillers, in particular reinforcing fillers, are the customary organic and inorganic fillers, reinforcements and weighting agents known per se. Specific examples are: inorganic fillers such as siliceous minerals, for example sheet silicates such as antigorite, serpentine, hornblendes, amphiboles, chrysotile, talc; metal oxides such as kaolin, aluminum oxides, aluminum silicate, titanium oxide and iron oxides, metal salts such as chalk, barite and inorganic pigments such as cadmium sulfide, zinc sulfide and also glass particles. Suitable organic fillers are, for example: carbon black, melamine, rosin, cyclopentadienyl resins and graft polymers.

The inorganic and organic fillers can be used individually or as mixtures and are advantageously incorporated into the reaction mixture in amounts of from 0.5 to 50% by weight, preferably from 1 to 40% by weight, based on the weight of the components (a) to (c).

Suitable flameproofing agents are, for example, tricresyl phosphate, tris(2-chloroethyl) phosphate, tris(2-chloropropyl) phosphate, tris(1,3-dichloropropyl) phosphate, tris(2,3-dibromopropyl) phosphate and tetrakis (2-chloroethyl)ethylene diphosphate.

In addition to the halogen-substituted phosphates mentioned above, it is also possible to use inorganic flameproofing agents such as red phosphorus, red phosphorus-containing finishers, hydrated aluminum oxide, antimony trioxide, arsenic oxide, ammonium polyphosphate and calcium sulfate, or cyanuric acid derivatives such as melamine or mixtures of at least two flameproofing agents such as ammonium polyphosphates and melamine and also, if desired, starch for flameproofing the PU rigid foams produced according to the invention. In general, it has been found to be advantageous to use from 5 to 50 parts by weight, preferably from 5 to 25 parts by weight, of the specified flameproofing agents or mixtures per 100 parts by weight of the components (a) to (c).

Further details on the other customary additives mentioned above can be found in the specialist literature, for example the monograph of J. H. Saunders and K. C. Frisch "High Polymers" volume XVI, Polyurethanes, parts 1 and 2, Interscience Publishers 1962 and 1964, or the Kunststoff-Handbuch, Polyurethane, volume VII, Carl-Hanser-Verlag, Munich, Vienna, 1st and 2nd edition, 1966 and 1983.

To produce the PU rigid foams, the polyester isocyanate semiprepolymers (a), the relatively high molecular weight compounds containing at least two reactive hydrogen atoms (b) and, if desired, chain extenders and/or crosslinkers (c) are reacted in such amounts that the equivalence ratio of NCO groups of the polyester isocyanate semiprepolymers (a) to the sum of the reactive hydrogen atoms of the components (b) and, if applicable, (c) is from 0.85 to 1.80:1, preferably from 0.95 to 1.35:1 and in particular from about 1.0 to 1.15:1. If the PU rigid foams are modified by the formation of isocyanurate groups, for example for increasing the flame resistance, a ratio of NCO groups of the polyester isocyanate semiprepolymers (a) to the sum of the reactive hydrogen atoms of the component (b) and, if applicable, (c) of from 1.8 to 10:1, preferably from 2.0 to 6:1 is usually used.

The PU rigid foams can be produced batchwise or continuously by known methods, for example the one-shot process using known mixing equipment.

It has been found to be particularly advantageous to use the two-component method and to combine the formative components (b), (d), (e) and, if desired, (c) and (f) in the component (A) and to use the polyester isocyanate semiprepolymers or mixtures of polyester isocyanate semiprepolymers and, if desired, blowing agent (d) as component (B).

The starting components are mixed at from 15° to 90° C., preferably from 20° to 35° C., and introduced into an open, if desired heated, mold in which the reaction mixture is allowed to foam essentially under atmospheric pressure to avoid a compacted surface zone. To form composite elements, the reverse side of a covering layer is advantageously covered, for example by casting or spraying, with the foamable reaction mixture and this is allowed to foam and cure to give the PU rigid foam.

The PU rigid foams produced by the process of the invention are essentially closed-celled and preferably have densities of from 20 to 50 g/l and a thermal conductivity which is usually less than 0.020, for example from 0.020 to 0.017 W/m.K or less.

The PU rigid foams are preferably used as a thermally insulating intermediate layer in composite elements and for filling hollow spaces in housings of refrigeration appliances with foam, in particular for refrigerators and freezer chests, and as external cladding of hot water tanks and remote heating pipes. The products are also suitable for insulating heated materials, as engine covers and as pipe shells.

EXAMPLES
Preparation of the Polyester Isocyanate Semiprepolymers

Examples AI to CIII

In a heatable reaction vessel, fitted with stirrer, a mixture of diphenylmethane diisocyanates and polyphenyl-polymethylene polyisocyanates containing 32.4% by weight of NCO and 39% by weight of diphenylmethane diisocyanate isomers, abbreviated to "raw MDI" in Table 1 below, was heated to 80° C. under an atmosphere of dried nitrogen.

The polyester-polyols were added to the polyisocyanate mixture at a constant rate over a period of 15 minutes, and the reaction mixture was stirred for 60 minutes at 80° C. to complete the reaction.

The amounts of raw MDI used and the type and amount of the polyester-polyol used, as well as the NCO content and the viscosity of the polyester isocyanate semiprepolymers prepared, are shown in Table 1.
Definitions for Table 1

PES I is a polyester-polyol having a hydroxyl number of 240 mg KOH/g and a viscosity, measured at 75° C. using a Haake rotation viscometer, of 185 mpa.s. prepared by polycondensation of phthalic anhydride with ethanediol and diethylene glycol in a molar ratio of 1:1:1.

PES II is a polyester-polyol having a hydroxyl number of 315 mg KOH/g and a viscosity, measured at 25° C. using a Haake rotation viscometer, of 2500 mPa.s. prepared by polycondensation of phthalic anhydride with ethanediol and diethylene glycol in a molar ratio of 1:1:1.

PES III is a polyester-polyol having a hydroxyl number of 56 mg KOH/g and a viscosity, measured at 25° C. using a Haake rotation viscometer, of 525 mpa.s. prepared by polycondensation of adipic acid with ethanediol and diethylene glycol in a molar ratio of 1:1:1.
Production of the PU Rigid Foams
Polycomponent I A mixture consisting of
64.78 parts by weight of a polyoxypropylene polyol having a hydroxyl number of 440, prepared by propoxylation of an initiator molecule mixture of glycerol and sucrose,
13.39 parts by weight of a polyoxypropylene-polyoxyethylene-polyol having a hydroxyl number of 115, prepared by propoxylation of N,N-dimethyldipropylenetriamine and subsequent ethoxylation of the polyoxypropylene adduct,
4.46 parts by weight of a polyoxypropylene glycol having a hydroxyl number of 250,
2.01 parts by weight of N,N-dimethylcyclohexylamine,
0.36 parts by weight of pentamethyldiethylenetriamine,
0.27 parts by weight of a solution of 47% by weight of potassium acetate in ethylene glycol,
2.23 parts by weight of a foam stabilizer based on silicone (Tegostab® B8462),
1.78 parts by weight of water and
10.71 parts by weight of technical-grade cyclopentane having a cyclopentane content greater than 96% by weight.
Polycomponent II
A mixture consisting of
43.3 parts by weight of a polyoxypropylene-polyol having a hydroxyl number of 440, prepared by propoxylation of an initiator molecule mixture of glycerol and sucrose,
12.0 parts by weight of a polyoxypropylene glycol having a hydroxyl number of 105,
20.0 parts by weight of a polyoxypropylene-polyol having a hydroxyl number of 490, prepared by propoxylation of an initiator molecule mixture of aqueous glycerol and sucrose,
1.2 parts by weight of a foam stabilizer based on silicone (Tegostab® B 8409),
0.3 parts by weight of bis(N,N-dimethylaminoethyl) ether,
0.7 parts by weight of N,N,N',N'-tetramethylhexamethylene-1,6-diamine,
0.4 parts by weight of tris(dimethylaminopropyl)-s-hexahydrotriazine,
0.4 parts by weight of N,N-dimethylcyclohexylamine,
1.7 parts by weight of water and
20.0 parts by weight of dichlorofluoroethane (R 141b).
Examples 1 to 11 and Comparative Examples I and II To produce the PU rigid foams, the polyester isocyanate semiprepolymers or raw MDI and the polyol component were mixed at 23° C. with intensive stirring in such amounts that the isocyanate index was 110. The reaction mixture was introduced into a metal mold heated to 40° C. and allowed to foam and cure in the closed mold.

The starting materials used and their amounts, as well as the densities of the PU rigid foam moldings produced and the thermal conductivity measured on the moldings, are shown in Table 2.

TABLE 1

Preparation of the polyester isocyanate semiprepolymers

| Examples and Comparative Example CE | Raw MDI [parts by weight] | Polyester-polyol Type | Amount [parts by weight] | Polyester isocyanate semiprepolymer NCO content [% by weight] | Viscosity[1] [mPa · s] |
|---|---|---|---|---|---|
| AI | 96 | PES I | 4 | 30.1 | 601 |
| AII | 92 | PES I | 8 | 28.1 | 1950 |
| AIII | 88 | PES I | 12 | 25.7 | 9200 |
| BI | 96 | PES II | 4 | 29.9 | 749 |
| BII | 92 | PES II | 8 | 27.6 | 3040 |
| BIII | 88 | PES II | 12 | 25.4 | 15750 |
| CI | 96 | PES III | 4 | 30.7 | 386 |
| CII | 92 | PES III | 8 | 29.4 | 643 |
| CIII | 88 | PES III | 12 | 27.9 | 1030 |
| CE | Raw MDI | — | — | 32.4 | 232 |

[1] measured at 25° C. using a Haake rotation viscometer

TABLE 2 a)

Starting materials for producing the PU rigid foams and their density and thermal conductivity

| Example | Polyol component Amount [parts by wt.] | Type | Polyester isocyanate semiprepolymer Amount [parts by wt.] | Type | PU rigid foams Density freely foamed [g/l] | Thermal conductivity [mW/m · K] |
|---|---|---|---|---|---|---|
| 1 | 100 | E | 122.0 | AI | 30.4 | 18.4 |
| 2 | 100 | E | 129.6 | AII | — | 19.0 |
| 3 | 100 | E | 142.0 | AIII | — | 18.7 |
| 4 | 100 | E | 122.0 | BI | — | 19.2 |
| 5 | 100 | E | 118.3 | CI | 30.0 | 18.0 |
| 6 | 100 | E | 124.5 | CII | 31.4 | 18.8 |
| 7 | 100 | E | 131.0 | CIII | — | 18.3 |
| 8 | 100 | F | 134.0 | AII | — | 17.3 |
| 9 | 100 | F | 126.0 | BI | — | 17.5 |
| 10 | 100 | F | 122.0 | CI | — | 18.2 |
| 11 | 100 | F | 135.0 | CIII | — | 18.6 |

TABLE 2 b)

| Comparative Examples | Polyol component Amount [parts by wt.] | Type | Polyester isocyanate semiprepolymer Amount [parts by wt.] | Raw MDI | PU rigid foams Thermal conducitivity [mW/m.K] |
|---|---|---|---|---|---|
| I | 100 | E | 112.6 | CE | 19.7 |
| II | 100 | F | 116.0 | CE | 20.0 |

We claim:

1. A CFC-free polyurethane rigid foam having improved thermal conductivity, said foam comprising the reaction product of
   a) an organic polyisocyanate mixture modified with urethane groups,
   b) a relatively high molecular weight compound containing at least two reactive hydrogen atoms and, optionally,
   c) a low molecular weight chain extender and/or a crosslinker
in the presence of
   d) a blowing agent,
   e) a catalyst and, optionally,
   f) additives,
wherein the polyisocyanate mixture comprises a polyester isocyanate semiprepolymer containing from 31 to 20% by weight of NCO and is obtained by reacting an excess amount of an aromatic polyisocyanate with a polyester-polyol having a hydroxyl number of from 22 to 400 prepared from aromatic and/or aliphatic dicarboxylic acids and/or dicarboxylic acid derivatives, and wherein the blowing agent is selected from the group consisting of cyclopentane and mixtures comprising cyclopentane, cyclohexane or mixtures thereof and low boiling compounds homogeneously miscible with cyclopentane and/or cyclohexane.

2. A foam as defined in claim 1, wherein the aromatic polyisocyanate is selected from the group consisting of 4,4'-, 2,4'- and 2,2'-diphenylmethane diisocyanate, polyphenylpolymethylene polyisocyanates, mixtures of diphenylmethane diisocyanate isomers and polyphenyl-polymethylene polyisocyanates, 2,4- and 2,6-tolylene diisocyanate or mixtures thereof.

3. A foam as defined in claim 1, wherein the aromatic polyisocyanate comprises a mixture of diphenylmethane diisocyanates and polyphenyl-polymethylene polyisocyanates having a diphenylmethane diisocyanate isomer content of less than 45 percent by weight.

4. A foam as defined in claim 1, wherein at least 10 percent by weight of radicals of the aromatic and/or aliphatic dicarboxylic acids are bonded to the polyester polyol.

5. A foam as defined in claim 1, wherein the polyesterpolyol is obtained by polycondensation of alkanedicarboxylic acids having from 4 to 6 carbon atoms, phthalic acid and/or a corresponding dicarboxylic acid derivative with mixtures of an alkanediol having from 2 to 6 carbon atoms and a dialkylene glycol having from 4 to 8 carbon atoms.

6. A foam as defined in claim 1, wherein the polyesterpolyol is selected from the group consisting of poly(ethanediol-diethylene glycol adipates) and poly(ethanediol-diethylene glycol phthalates).

7. A foam as defined in claim 1, wherein the relatively high molecular weight compound comprises a polyhydroxyl compound having a functionality of from 2 to 8 and a hydroxyl number of from 100 to 850.

8. A foam as defined in claim 1, wherein the relatively high molecular weight compound comprises a polyetherpolyol having a functionality from 2 to 8 and a hydroxyl number of from 100 to 850 and is prepared by anionic polyaddition of ethylene oxide, 1,2-propylene oxide or ethylene oxide and 1,2-propylene oxide to an aromatic initiator molecule selected from the group consisting of aromatic polycarboxylic acids, aromatic hydroxycarboxylic acids and aromatic aminocarboxylic acids, aromatic monoamines and polyamines, polyphenols and Mannich condensates of phenols, formaldehyde and dialkanolamines.

9. A foam as defined in claim 1, wherein the blowing agent comprises cyclopentane and water.

10. A foam as defined in claim 1, wherein the blowing agent comprises:

cyclopentane, cyclohexane or a mixture thereof;

a low-boiling compound homogeneously miscible with cyclopentane and/or cyclohexane; and water.

* * * * *